United States Patent [19]
Friesch

[11] Patent Number: 5,489,453
[45] Date of Patent: Feb. 6, 1996

[54] ADHESIVE STORAGE AND SHIPMENT CONTAINER

[76] Inventor: Andrew J. Friesch, W73 N1030 Poplar Ave., Cedarburg, Wis. 53012

[21] Appl. No.: 259,296

[22] Filed: Jun. 13, 1994

[51] Int. Cl.$^6$ .......................... B29D 22/00; B65D 57/00
[52] U.S. Cl. ................. 428/34.1; 428/34.2; 428/35.7; 428/181; 428/215; 428/451; 428/481; 428/537.5; 206/447; 206/524.1; 206/813
[58] Field of Search ..................... 428/174, 182, 428/34.1, 34.2, 35.7, 121, 130, 181, 213, 215, 451, 481, 537.5; 206/447, 524.1, 813; 229/3.5 R, 4.5

[56] References Cited

U.S. PATENT DOCUMENTS

| | | | |
|---|---|---|---|
| 4,026,458 | 5/1977 | Morris et al. | 229/30 |
| 4,148,429 | 4/1979 | Burr et al. | 229/36 |
| 5,203,491 | 4/1993 | Marx et al. | 229/2.5 R |

Primary Examiner—Donald J. Loney
Attorney, Agent, or Firm—Whyte Hirschboeck Dudek

[57] ABSTRACT

A container for holding an adhesive is frusto-conical or cylindrical in shape and has a bottom wall and a pleated side wall. The container has a twin substrate composition throughout. The first substrate is paper having a small enough caliper to allow for proper forming and to maintain the shape of the container once it is formed. The second substrate is a polyester film thin enough to allow the paper substrate to maintain its shape, but sufficiently thick to hold the adhesive or other material to be stored. The first and second substrates are glued together with a water-based or hot melt pressure-sensitive adhesive.

15 Claims, 2 Drawing Sheets

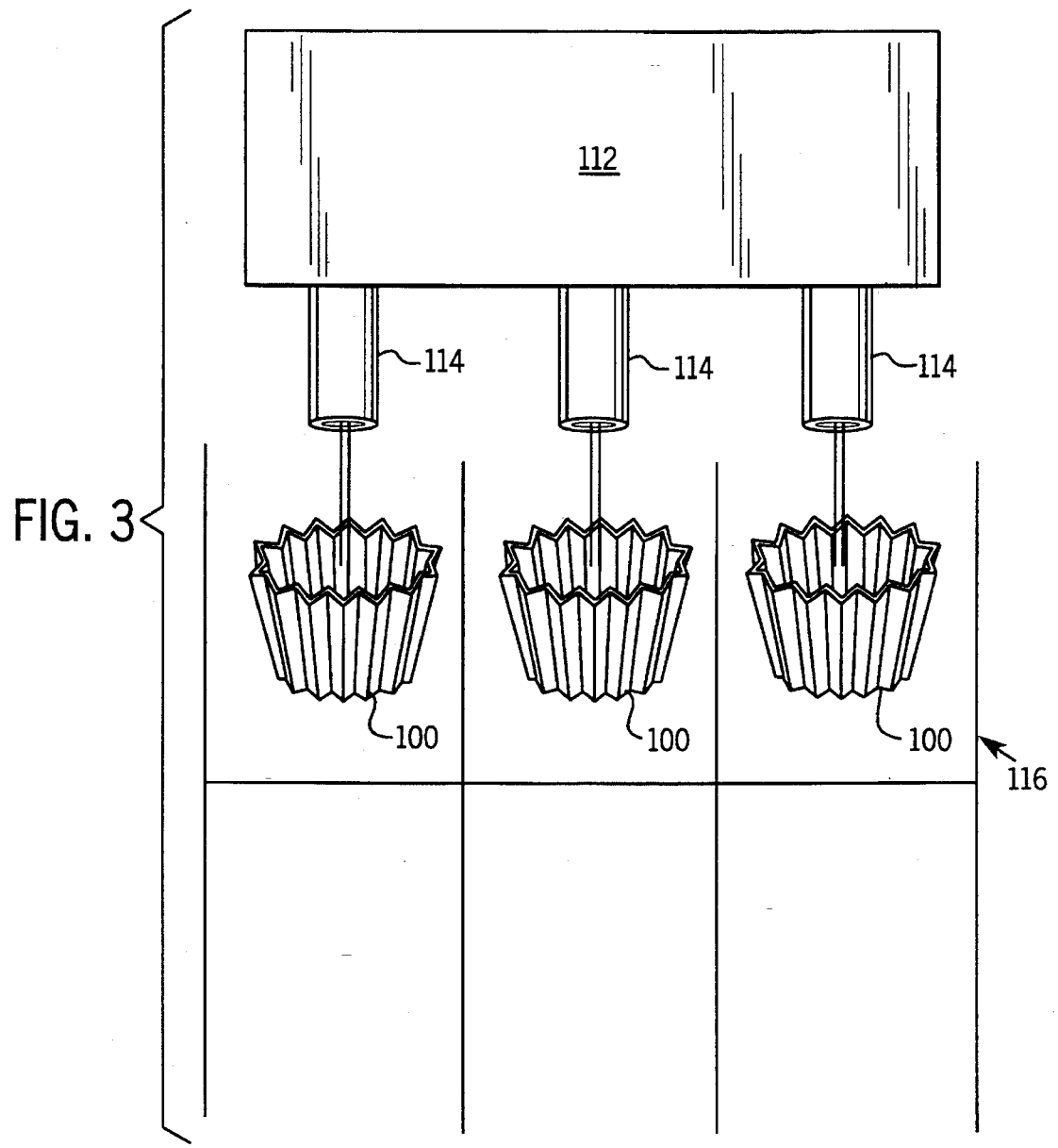

5,489,453

ADHESIVE STORAGE AND SHIPMENT CONTAINER

Cross-references to related applications, if any: None. Statement as to rights to inventions made under federally-sponsored research and development, if any: None.

BACKGROUND OF THE INVENTION

1. Field of the Invention

The present invention relates generally to containers for storage and shipment of adhesives and other materials which have adhesive properties and which are packaged in a liquid state and shipped in a solid state. More specifically, the present invention relates to a simple container which may be used to store and ship a wide variety of adhesives and other materials at a substantially lower cost and with less waste than earlier containers.

2. Description of Related Art

Generally, earlier packaging configurations have been bulky, expensive and labor-intensive to use. One example of such a system is the so-called "Menasha Carton" covered by U.S. Pat. No. 4,148,429, issued to Burr et al. on Apr. 10, 1979, and assigned to the Menasha Corporation of Menasha, Wis. This folded carton has a polymer-lined interior. The carton is extremely bulky and the folding and opening of the carton is labor-intensive in use. Moreover, the market cost of such a carton is $0.21 per pound.

Another configuration used for packaging of adhesives and other materials is a co-extruded pillow, which envelopes or encapsulates the adhesive in a pillow of polyethylene or other appropriate material. Such a system is only efficient if a high volume of material is being packaged and shipped. Absent such high volume, the cost becomes prohibitive because of tooling and operational costs.

Another configuration used for packaging hot melt adhesives is a polyethylene boat. Generally, the "boat" is made of polyethylene material into which the hot adhesive is poured. In order to prevent melting of the boat, a heat sink needs to be used to keep the polyethylene at a low enough temperature. Use of the heat sink generates additional costs and the need for additional equipment. Moreover, significant costs are incurred since molding dies are required to use this type of container.

Finally, some materials are shipped in a tube-type package which suffers from some of the same drawbacks as other earlier designs.

A packaging container which provides a cost-effective means for packaging and shipping adhesives and other, similar materials and overcomes the shortcomings of earlier containers would represent a significant advancement in the art.

OBJECTS AND SUMMARY OF THE INVENTION

It is an object of the present invention to provide an adhesive storage and shipment container which is inexpensive to manufacture and use.

It is another object of the present invention to provide an adhesive storage and shipment container which creates less waste after use than earlier containers.

It is a different object of the present invention to provide an adhesive storage and shipment container which is flexible in size and configuration to adapt to different filling and shipping operations.

How these and other objects of the present invention are accomplished will be explained in the detailed description of the preferred and alternate embodiments of the invention in connection with the FIGURES. Generally, however, the objects of the invention are accomplished in a container for holding an adhesive. The container preferably is frusto-conical or cylindrical in shape and has a bottom wall and a pleated side wall. The container has a twin substrate composition throughout. The first substrate is paper having a small enough caliper to allow for proper forming and to maintain the shape of the container once it is formed. The second substrate is a polyester film thin enough to allow the paper substrate to maintain its shape, but sufficiently thick to hold the adhesive or other material to be stored. The first and second substrates are glued together with a water-based or hot melt pressure-sensitive adhesive.

Other variations, modifications, applications, advantages and ways in which the objects are accomplished will become apparent to those presently of ordinary skill in the art after reviewing the specification and are deemed to fall within the scope of the present invention if they fall within the scope of the claims which follow the description of the preferred and any alternate embodiments.

DETAILED DESCRIPTION OF THE DRAWINGS

FIG. 3 is a perspective view of an adhesive container filling line utilizing the container of the present invention.

In the FIGURES, like reference numerals refer to like components.

DESCRIPTION OF THE PREFERRED EMBODIMENT

Figure 1:
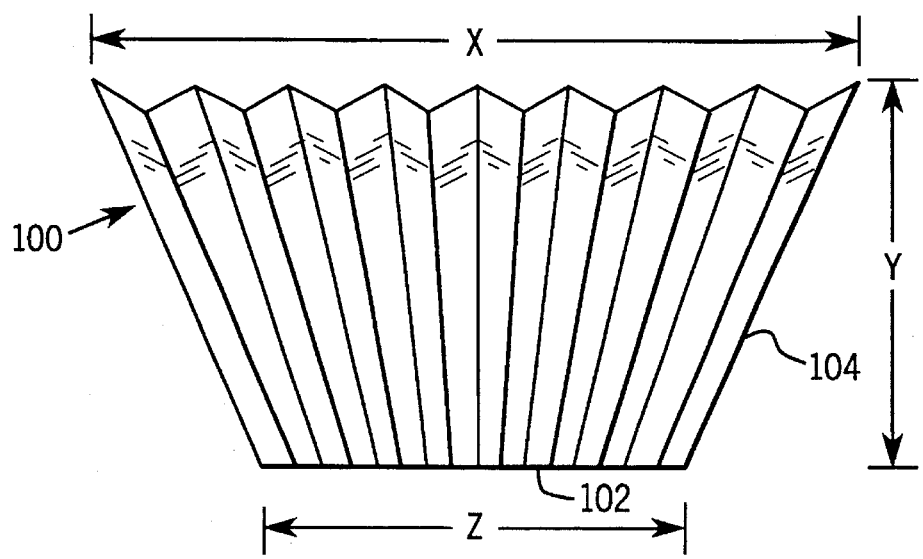
FIG. 1 is a perspective view of the preferred embodiment of the container of the present invention.

The present invention is a container for storing and shipping hot melt adhesives or other materials. The preferred embodiment of the present invention is shown in FIG. 1. Container 100 resembles a coffee filter. This pleated cylinder is made of a unique paper/film laminate which allows the container 100 to maintain its shape while providing strength and release capabilities for the material being stored. The container 100 generally is frusto-conical in shape, having a bottom wall 102 and a side wall 104. The side wall 104 is pleated to permit movement and expansion of the diameter of the upper rim of the container 100.

One important benefit of the shape of the present invention is its easy and space saving storage prior to use. Because of the unique shape of the container 100, large numbers of the containers can be nested prior to use. This nesting feature represents an economic benefit to the user.

Figure 2:
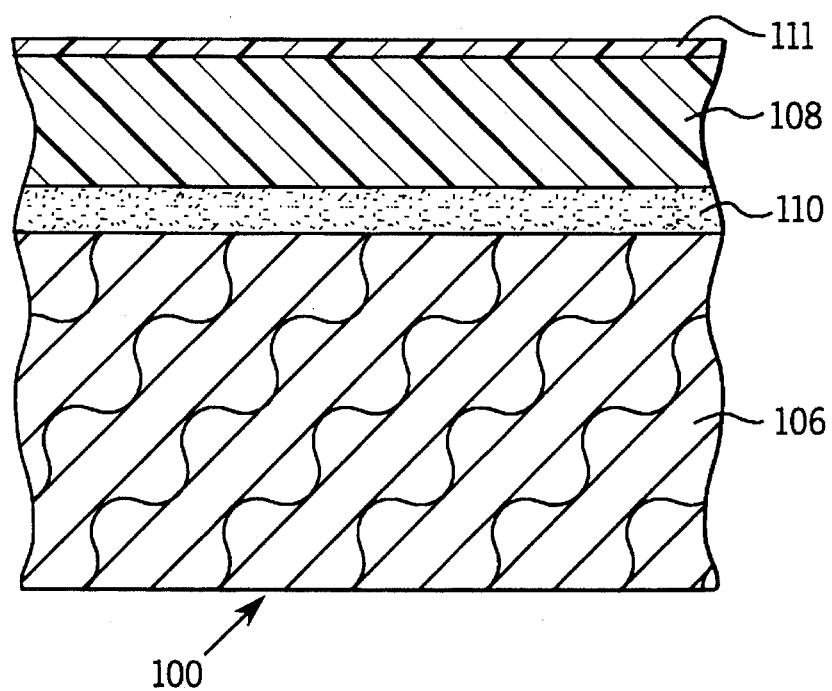
FIG. 2 is a cross-sectional view of the container of FIG. 1.

FIG. 2 shows the composition of the walls of container 100. Generally, the container 100 is composed of two substrates. The first substrate 106 is paper. In the preferred embodiment, 60 pound offset paper having a caliper of 7 or less is used in the paper substrate. The paper substrate 106 is used to form the container 100 and maintain its shape during filling and shipping. The container 100 is formed using the same process as that used for coffee filters and other pressed and formed paper products. Generally, heat, pressure and steam are used in connection with a male/female die configuration to press and form the container 100.

A second substrate 108 is composed of polyester film having a silicone coating 111 on its interior surface. Substrates 106 and 108 are glued together with an adhesive 110. In the preferred embodiment, adhesive 110 is a hot melt, pressure-sensitive adhesive. The silicone coating 111 on the polyester film 108 allows easy release of material held in container 100. Lamination of the two substrates is known in the art and the specific characteristics of the paper/film laminate are a matter of design choice.

In the preferred embodiment, the polyester film can withstand filling temperatures up to 375° F. without melting or distorting. The polyester film should be less than 1 mil in thickness and is preferably 0.5 mil. The film should be kept to 1 mil or less, since thicker film makes proper forming of the container 100 more difficult and more costly.

A filling operation is shown in FIG. 3. An adhesive manifold 112 has spouts 114. Adhesive is dispensed from spouts 114 into a plurality of containers 100 moving on a conveyor belt type of a mechanism 116. In this way, a plurality of containers 100 can be filled quickly and efficiently.

The present invention avoids a number of the drawbacks of earlier configurations. No molding dies or other labor or capital intensive setup is needed for the filling operation. Since the containers can be nested before use, they occupy substantially less storage space prior to filling. The container also can fit all known commercial hot melt adhesive filling equipment. The present invention generates significantly less waste after use.

Variations, modifications and other applications of the present invention will become apparent to those presently of ordinary skill in the art after reviewing the specification in connection with the FIGURES. Therefore, the above description of the preferred embodiment is to be interpreted as illustrative rather than limiting. The scope of the present invention is to be limited solely by the scope of the claims which follow.

What is claimed is:

1. A container for holding an adhesive, said container comprising a sheet, said sheet formed as a pleated cylinder having a bottom wall and a side wall having a plurality of pleats, said sheet comprising:
   a) a first substrate made of paper; and
   b) a second substrate, said second substrate being comprised of polyester film having a silicone coating on the interior surface thereof relative to said container; and
   c) adhesive joining said first and second substrates.

2. The container of claim 1 wherein said paper has a maximum thickness of about 7 caliper.

3. The container of claim 2 wherein said polyester film has a maximum thickness of about 1 mil.

4. The container of claim 3 wherein said polyester film has a thickness of about 0.5 mil.

5. The container of claim 4 wherein said adhesive joining said first and second substrates is a hot melt, pressure-sensitive adhesive.

6. A container for holding an adhesive, said container made from a sheet and being generally frusto-conical in shape having a flat bottom wall and a flexible continuously pleated side wall, said sheet comprising:
   a) a first substrate made of a shaping material;
   b) a second substrate, said second substrate comprising a second, strength-imparting material; and
   c) adhesive joining said first and second substrates.

7. The container of claim 6 wherein said first material is paper and said second material is polyester film.

8. The container of claim 6 wherein said first material has a thickness not greater than about 7 caliper and further wherein said second material has a thickness not greater than about 1 mil.

9. The container of claim 8 wherein the thickness of said first material is about 7 caliper and further wherein the thickness of said second material is about 0.50 mil.

10. The container of claim 7 wherein said first material has a thickness not greater than about 7 caliper and further wherein said second material has a thickness not greater than about 1 mil.

11. The container of claim 10 wherein the thickness of said first material is about 7 caliper and further wherein the thickness of said second material is about 0.50 mil.

12. The container of claim 6 wherein said second substrate further comprises a coating of a third material on the interior surface of said second, strength-imparting material relative to said container, said coating assisting in the release of an adhesive held in said container.

13. The container of claim 12 wherein said first material is paper and said second material is polyester film and said third material is silicone.

14. The container of claim 13 wherein said first substrate is not greater than 7 caliper; and
   further wherein said polyester film is not thicker than 1 mil; and
   further wherein said adhesive joining said first and second substrates is a hot melt, pressure-sensitive adhesive.

15. A container for holding an adhesive, said container made from a sheet and being generally frusto-conical in shape having a flat bottom wall and a flexible continuously pleated side wall, said sheet comprising:
   a) a first substrate made of 60 pound offset paper having a thickness not greater than 7 caliper, said paper permitting the forming and maintenance of the shape of said container;
   b) a second substrate, said second substrate comprising
      1) a polyester film having a thickness not greater than 1.0 mil capable of withstanding temperatures up to 375° F.; and
      2) a silicone coating on the interior surface thereof relative to said container; and
   c) a hot melt, pressure-sensitive adhesive joining said first and second substrates.

\* \* \* \* \*